US012706022B2

(12) United States Patent
Lee et al.

(10) Patent No.: US 12,706,022 B2
(45) Date of Patent: Aug. 11, 2026

(54) POWER MANAGER CONTROLLING SUPPLY OF DRIVING VOLTAGES PREVENTING DISPLAY PANEL DAMAGE

(71) Applicant: Samsung Display Co., LTD., Yongin-si (KR)

(72) Inventors: Yoon Young Lee, Yongin-si (KR); Sungchun Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/545,165

(22) Filed: Dec. 19, 2023

(65) Prior Publication Data

US 2024/0249669 A1 Jul. 25, 2024

(30) Foreign Application Priority Data

Jan. 20, 2023 (KR) ........................ 10-2023-0009061

(51) Int. Cl.
*G09G 3/32* (2016.01)
*G09G 3/3291* (2016.01)

(52) U.S. Cl.
CPC ............. *G09G 3/32* (2013.01); *G09G 3/3291* (2013.01); *G09G 2310/0275* (2013.01); *G09G 2330/021* (2013.01); *G09G 2330/028* (2013.01); *G09G 2330/04* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/3258; G09G 3/3266; G09G 3/3275; G09G 3/3283; G09G 3/3291; G09G 2310/0267; G09G 2310/0289; G09G 2330/028
USPC ...................................................... 345/76–83
See application file for complete search history.

(56) References Cited

U.S. PATENT DOCUMENTS

| | | | | |
|---|---|---|---|---|
| 11,574,566 | B2 * | 2/2023 | Lee | G09G 3/006 |
| 11,620,941 | B2 * | 4/2023 | Lee | H02M 1/084 345/204 |
| 12,519,393 | B2 * | 1/2026 | Park | G09G 3/2096 |
| 2009/0109147 | A1 * | 4/2009 | Park | G09G 3/3233 345/76 |

(Continued)

FOREIGN PATENT DOCUMENTS

| | | | |
|---|---|---|---|
| KR | 101254263 | B1 | 4/2013 |
| KR | 1020130003246 | A | 6/2018 |
| KR | 1020200067289 | A | 6/2020 |

*Primary Examiner* — Ke Xiao
*Assistant Examiner* — Nelson Lam
(74) *Attorney, Agent, or Firm* — CANTOR COLBURN LLP

(57) ABSTRACT

A power manager includes a first driving voltage generator which supplies a first driving voltage to a first power line and a second driving voltage generator which supplies a second driving voltage to a second power line, where a voltage level of the second driving voltage is lower than a voltage level of the first driving voltage. During an initial driving period in which the first driving voltage is supplied to the first power line and before the second driving voltage is supplied to the second power line, the second driving voltage generator senses a voltage of the second power line, and a supply of the first driving voltage is controlled based on the voltage of the second power line.

16 Claims, 11 Drawing Sheets

(56) References Cited

U.S. PATENT DOCUMENTS

| | | | | |
|---|---|---|---|---|
| 2010/0103203 | A1* | 4/2010 | Choi | G09G 3/3283 345/77 |
| 2011/0273427 | A1* | 11/2011 | Park | G09G 3/3225 345/212 |
| 2012/0327063 | A1* | 12/2012 | Izawa | G09G 3/3208 345/212 |
| 2013/0113775 | A1* | 5/2013 | Seo | G09G 3/3208 345/82 |
| 2013/0235016 | A1* | 9/2013 | Seo | G09G 3/3208 345/212 |
| 2013/0328854 | A1 | 12/2013 | Ruan et al. | |
| 2015/0123964 | A1* | 5/2015 | Lee | G09G 3/3225 345/82 |
| 2015/0287362 | A1* | 10/2015 | Lee | G09G 3/3266 315/173 |
| 2016/0049113 | A1* | 2/2016 | Park | G09G 3/3208 345/212 |
| 2016/0117979 | A1* | 4/2016 | An | G09G 3/3208 345/76 |
| 2016/0125791 | A1* | 5/2016 | Park | H02M 3/1584 345/76 |
| 2016/0179179 | A1* | 6/2016 | An | G06F 1/263 345/212 |
| 2020/0043437 | A1* | 2/2020 | Pyun | G09G 3/20 |
| 2020/0144916 | A1* | 5/2020 | Lee | H02M 1/36 |
| 2020/0402455 | A1* | 12/2020 | Kim | G09G 3/3233 |
| 2023/0037648 | A1* | 2/2023 | Yoon | G09G 3/3258 |
| 2023/0252926 | A1* | 8/2023 | Hong | H02M 3/158 345/211 |
| 2023/0282168 | A1* | 9/2023 | Yoon | G09G 3/3233 345/76 |

* cited by examiner

POWER MANAGER CONTROLLING SUPPLY OF DRIVING VOLTAGES PREVENTING DISPLAY PANEL DAMAGE

This application s priority to Korean Patent Application No. 10-2023-0009061, filed on Jan. 20, 2023, and all the benefits accruing therefrom under 35 U.S.C. § 119, the content of which in its entirety is herein incorporated by reference.

BACKGROUND

1. Field

Embodiments relate to a power manager of a display device. More particularly, embodiments related to a power manager for controlling supply of driving voltages, a method of driving the power manager, and a display device including the power manager.

2. Description of the Related Art

A display device may include a power management integrated circuit ("PMIC") that converts an input voltage into a driving voltage and provides the converted driving voltage to a display panel. The driving voltage generated by the PMIC may be supplied to pixels included in the display panel, and the pixels may emit light based on the driving voltage.

SUMMARY

A PMIC may provide a short circuit protection ("SCP") function to prevent damage (e.g., burnt, etc.) of the PMIC and/or the display panel due to a short-circuit of a power line that transmits the driving voltage. However, since a conventional SCP function is performed during the driving of the display panel in which the driving voltage is supplied to the display panel, the PMIC and/or the display panel may be damaged due to a short-circuit of the power line in an initial driving period before the driving voltage is supplied to the display panel.

Embodiments provide a power manager for preventing damage of the power manager and/or a display panel.

Embodiments provide a method of driving a power manager for preventing damage of the power manager and/or a display panel.

Embodiments provide a display device including a power manager for preventing damage of the power manager and/or a display panel.

A power manager according to embodiments includes a first driving voltage generator which supplies a first driving voltage to a first power line and a second driving voltage generator which supplies a second driving voltage to a second power line, where a voltage level of the second driving voltage is lower than a voltage level of the first driving voltage. In such embodiments, during an initial driving period in which the first driving voltage is supplied to the first power line and before the second driving voltage is supplied to the second power line, the second driving voltage generator senses a voltage of the second power line, and a supply of the first driving voltage is controlled based on the voltage of the second power line.

In an embodiment, the second driving voltage generator may include a second driving voltage converter which generates the second driving voltage by converting an input voltage supplied from an outside, a second comparator which compares the voltage of the second power line and a second reference voltage, and a second determiner which outputs a second shutdown signal to the first driving voltage generator in response to an output signal of the second comparator.

In an embodiment, the second driving voltage converter may include a third transistor connected between a second input terminal which receives the input voltage and a second intermediate node, where the third transistor operates in response to a third control signal, a second inductor connected between the second intermediate node and a ground node, and a fourth transistor connected between the second intermediate node and the second power line, where the fourth transistor operates in response to a fourth control signal.

In an embodiment, the second comparator may be activated during at least a part of the initial driving period and deactivated after the initial driving period.

In an embodiment, the second determiner may output the second shutdown signal when the voltage of the second power line is greater than or equal to the second reference voltage.

In an embodiment, the first driving voltage generator may stop the supply of the first driving voltage in response to the second shutdown signal.

In an embodiment, during a pre-charge period in which the first driving voltage having a first voltage level is supplied to the first power line and before the first driving voltage having a second voltage level higher than the first voltage level is supplied to the first power line, the first driving voltage generator may sense a voltage of the first power line, and may control the supply of the first driving voltage based on the voltage of the first power line.

In an embodiment, the first driving voltage generator may include a first driving voltage converter which generates the first driving voltage by converting an input voltage supplied from an outside, a first comparator which compares the voltage of the first power line and a first reference voltage, and a first determiner which outputs a first shutdown signal to the first driving voltage converter in response to an output signal of the first comparator.

In an embodiment, the first driving voltage converter may include a first inductor connected between a first input terminal which receives the input voltage and a first intermediate node, a first transistor connected between the first intermediate node and a ground node, where the first transistor operates in response to a first control signal, and a second transistor connected between the first intermediate node and the first power line, where the second transistor operates in response to a second control signal.

In an embodiment, the first comparator may be activated during at least a part of the pre-charge period and deactivated after the pre-charge period.

In an embodiment, the first determiner may output the first shutdown signal when the voltage of the first power line is less than the first reference voltage.

In an embodiment, the first driving voltage converter may stop a generation of the first driving voltage in response to the first shutdown signal.

A method of driving a power manager according to embodiments includes supplying a first driving voltage to a first power line, sensing a voltage of a second power line during an initial driving period in which the first driving voltage is supplied to the first power line and before a second driving voltage is supplied to the second power line, where a voltage level of the second driving voltage is lower than a voltage level of the first driving voltage, and controlling a supply of the first driving voltage based on the voltage of the second power line.

In an embodiment, controlling the supply of the first driving voltage based on the voltage of the second power line may include comparing the voltage of the second power line and a second reference voltage, and stopping the supply of the first driving voltage when the voltage of the second power line is greater than or equal to the second reference voltage.

In an embodiment, the method may further include supplying the second driving voltage to the second power line when the voltage of the second power line is less than the second reference voltage.

In an embodiment, the method may further include sensing a voltage of the first power line during a pre-charge period in which the first driving voltage having a first voltage level is supplied to the first power line and before the first driving voltage having a second voltage level higher than the first voltage level is supplied to the first power line, and controlling the supply of the first driving voltage based on the voltage of the first power line.

In an embodiment, controlling the supply of the first driving voltage based on the voltage of the first power line may include comparing the voltage of the first power line and a first reference voltage, and stopping the supply of the first driving voltage when the voltage of the first power line is less than the first reference voltage.

A display device according to embodiments includes a display panel which includes a pixel, a scan driver which supplies a scan signal to the pixel, a data driver which supplies a data signal to the pixel, and a power manager which supplies a first driving voltage and a second driving voltage to the pixel, where a voltage level of the second driving voltage is lower than a voltage level of the first driving voltage. In such embodiments, the power manager includes a first driving voltage generator which supplies the first driving voltage to the pixel through a first power line, and a second driving voltage generator which supplies the second driving voltage to the pixel through a second power line. In such embodiments, during an initial driving period in which the first driving voltage is supplied to the first power line and before the second driving voltage is supplied to the second power line, the second driving voltage generator may sense a voltage of the second power line, and a supply of the first driving voltage is controlled based on the voltage of the second power line.

In an embodiment, during a pre-charge period in which the first driving voltage having a first voltage level is supplied to the first power line and before the first driving voltage having a second voltage level higher than the first voltage level is supplied to the first power line, the first driving voltage generator may sense a voltage of the first power line, and may control the supply of the first driving voltage based on the voltage of the first power line.

In an embodiment, the pixel may include a driving transistor connected between the first power line and a first node, where the driving transistor operates in response to a voltage of a second node, a switching transistor connected between a data line which transmits the data signal and the second node, where the switching transistor operates in response to the scan signal, a storage capacitor connected between the first power line and the second node, and a light emitting diode connected between the first node and the second power line.

In the power manager, the method of driving the power manager, and the display device including the power manager according to embodiments, during the initial driving period in which the first driving voltage is supplied to the first power line and before the second driving voltage is supplied to the second power line, the voltage of the second power line may be sensed, and the supply of the first driving voltage may be controlled based on the voltage of the second power line, such that damage of the power manager and/or the display panel may be effectively prevented.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
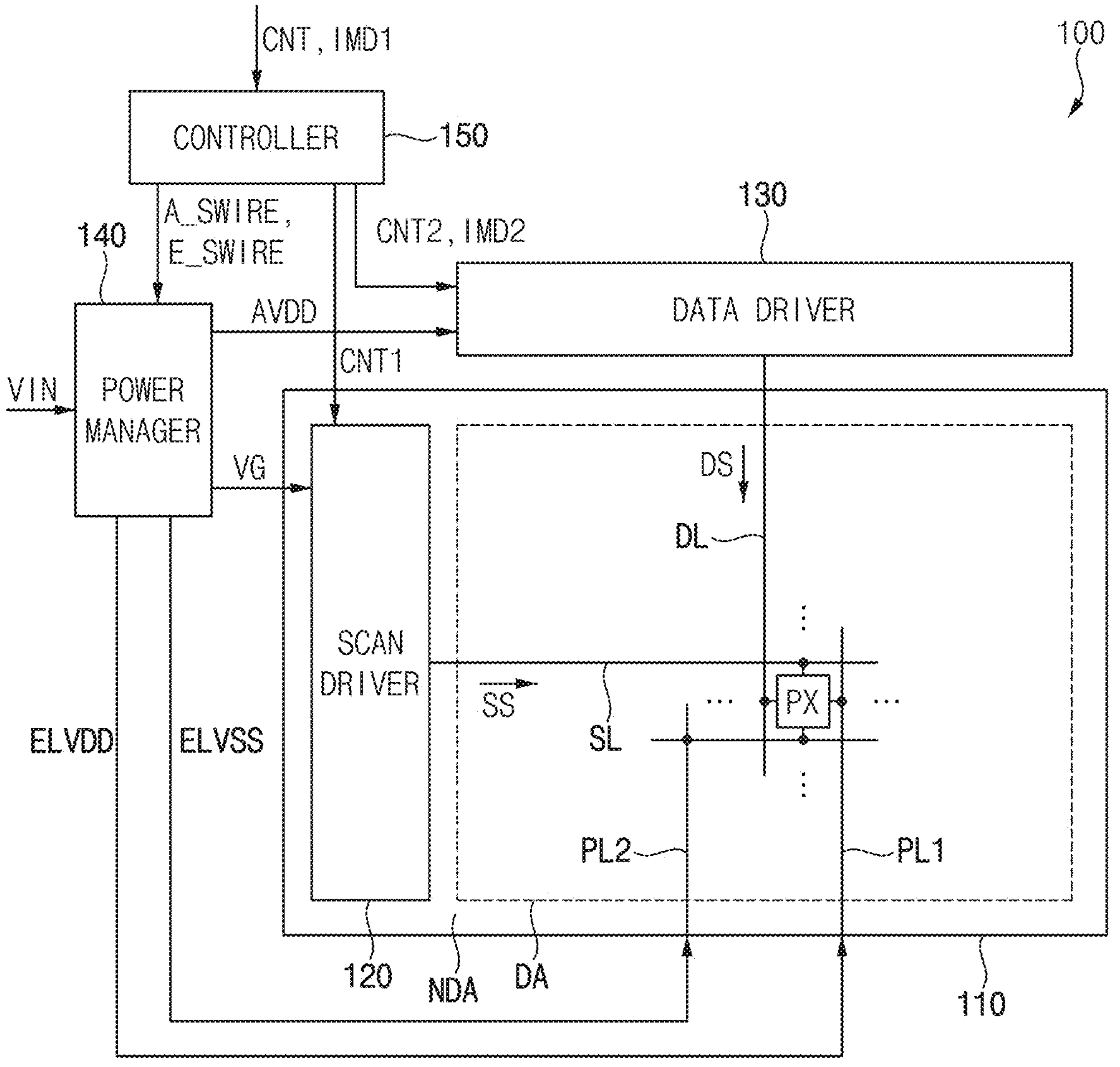
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, a power manager, a method of driving a power manager, and a display device according to embodiments of the disclosure will be described in detail with reference to the accompanying drawings. The same or similar reference numerals will be used for the same elements in the accompanying drawings.

FIG. 1 is a block diagram illustrating a display device 100 according to an embodiment.

Referring to FIG. 1, an embodiment of the display device 100 may include a display panel 110, a scan driver 120, a data driver 130, a power manager 140, and a controller 150.

The display panel 110 may include a plurality of pixels PX. The pixels PX may be disposed in a display area DA of the display panel 110. Each of the pixels PX may be connected to a scan line SL, a data line DL, a first power line PL1, and a second power line PL2. The scan line SL may transmit a scan signal SS, and the data line DL may transmit a data signal DS. The first power line PL1 may transmit a first driving voltage ELVDD, and the second power line PL2 may transmit a second driving voltage ELVSS.

Figure 2:
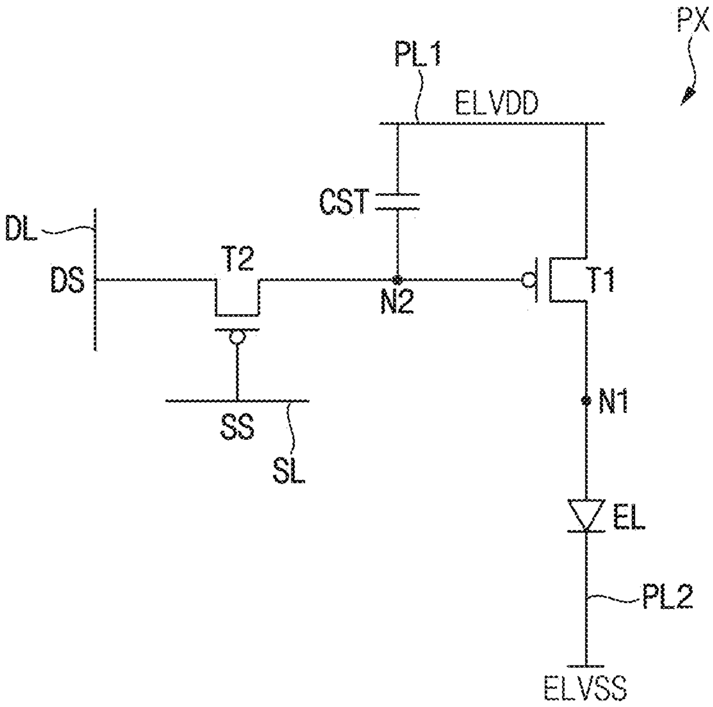
FIG. 2 is a circuit diagram illustrating a pixel according to an embodiment.

FIG. 2 is a circuit diagram illustrating a pixel PX according to an embodiment.

Referring to FIG. 2, an embodiment of the pixel PX may include a driving transistor T1, a switching transistor T2, a storage capacitor CST, and a light emitting diode EL.

The driving transistor T1 may be connected between the first power line PL1 and a first node N1, and may operate (i.e., be turned on or off) in response to a voltage of a second node N2. The driving transistor T1 may include a first electrode (e.g., a source electrode) connected to the first power line PL1, a second electrode (e.g., a drain electrode) connected to the first node N1, and a gate electrode connected to the second node N2.

The switching transistor T2 may be connected between the data line DL and the second node N2, and may operate in response to the scan signal SS. The switching transistor T2 may include a first electrode (e.g., a source electrode) connected to the data line DL, a second electrode (e.g., a drain electrode) connected to the second node N2, and a gate electrode connected to the scan line SL.

FIG. 2 illustrates an embodiment in which each of the driving transistor T1 and the switching transistor T2 is a P-type transistor (e.g., a p-channel metal-oxide semiconductor ("PMOS") transistor), but the disclosure is not limited thereto. In another embodiment, at least one selected from the driving transistor T1 and the switching transistor T2 may be an N-type transistor (e.g., an n-channel metal-oxide semiconductor ("NMOS") transistor).

The storage capacitor CST may be connected between the first power line PL1 and the second node N2.

FIG. 2 illustrates an embodiment in which the pixel PX includes two transistors T1 and T2 and one capacitor CST, but the disclosure is not limited thereto. In an alternative embodiment, the pixel PX may include three or more transistors and/or two or more capacitors.

The light emitting diode EL may be connected between the first node N1 and the second power line PL2. The light emitting diode EL may include an anode connected to the first node N1 and a cathode connected to the second power line PL2. The light emitting diode EL may be an organic light emitting diode or an inorganic light emitting diode such as a micro light emitting diode or a quantum-dot light emitting diode.

Referring back to FIG. 1, the scan driver 120 may generate the scan signals SS based on a scan control signal CNT1 and a gate voltage VG. The scan driver 120 may supply the scan signals SS to the pixels PX. The scan driver 120 may sequentially supply the scan signals SS in units of pixel rows. In an embodiment, the scan control signal CNT1 may include a scan start signal, a scan clock signal, or the like. In an embodiment, the scan driver 120 may be disposed in a non-display area NDA of the display panel 110. In an alternative embodiment, the scan driver 120 may be implemented with at least one integrated circuit.

The data driver 130 may generate the data signals DS based on a data control signal CNT2, second image data IMD2, and a data driving voltage AVDD. The data driver 130 may supply the data signals DS to the pixels PX. The data driver 130 may supply the data signals DS to a pixel row selected by the scan signal SS. In an embodiment, the data control signal CNT2 may include a horizontal start signal, an output data enable signal, a load signal, or the like. In an embodiment, the data driver 130 may be implemented with at least one integrated circuit. In an alternative embodiment, the data driver 130 and the controller 150 may be implemented as a single integrated circuit, and such an integrated circuit may be referred to as a timing controller embedded data driver ("TED").

The power manager 140 may generate the first driving voltage ELVDD, the second driving voltage ELVSS, the data driving voltage AVDD, and the gate voltage VG based on an input voltage VIN, a first power control signal A_SWIRE, and a second power control signal E_SWIRE. The input voltage VIN may be supplied from an external source (e.g., a battery). The power manager 140 may supply the first driving voltage ELVDD and the second driving voltage ELVSS to the pixels PX. The power manager 140 may supply the data driving voltage AVDD to the data driver 130, and may supply the gate voltage VG to the scan driver 120. In an embodiment, the power manager 140 may be implemented as an integrated circuit, and such an integrated circuit may be referred to as a power management integrated circuit ("PMIC").

A voltage level of the second driving voltage ELVSS may be lower than a voltage level of the first driving voltage ELVDD. In an embodiment, the first driving voltage ELVDD may be greater than 0 volt (V), and the second driving voltage ELVSS may be less than or equal to 0 V.

The data driving voltage AVDD may be a voltage for driving the data driver 130. The data driving voltage AVDD may be divided into a plurality of gamma voltages.

The gate voltage VG may be a voltage for driving the scan driver 120. The gate voltage VG may include a gate turn-on voltage (e.g., a logic low voltage) and a gate turn-off voltage (e.g., a logic high voltage).

The controller (e.g., timing controller ("TCON")) 150 may receive first image data IMD1 and a control signal CNT from an external host processor (e.g., graphics processing unit ("GPU"), application processor ("AP"), or graphic card). In an embodiment, the control signal CNT may include a vertical synchronizing signal, a horizontal synchronizing signal, an input data enable signal, a master clock signal, or the like. The controller 150 may generate the second image data IMD2 by compensating the first image data IMD1. The controller 150 may generate the scan control signal CNT1, the data control signal CNT2, the first power control signal A_SWIRE, and the second power control signal E_SWIRE based on the control signal CNT. The controller 150 may control an operation of the scan driver 120 by providing the scan control signal CNT1 to the scan driver 120, and may control an operation of the data driver 130 by providing the second image data IMD2 and data control signal CNT2 to the data driver 130. The controller 150 may control an operation of the power manager 140 by providing the first power control signal A_SWIRE and the second power control signal E_SWIRE to the power manager 140.

Figure 3:
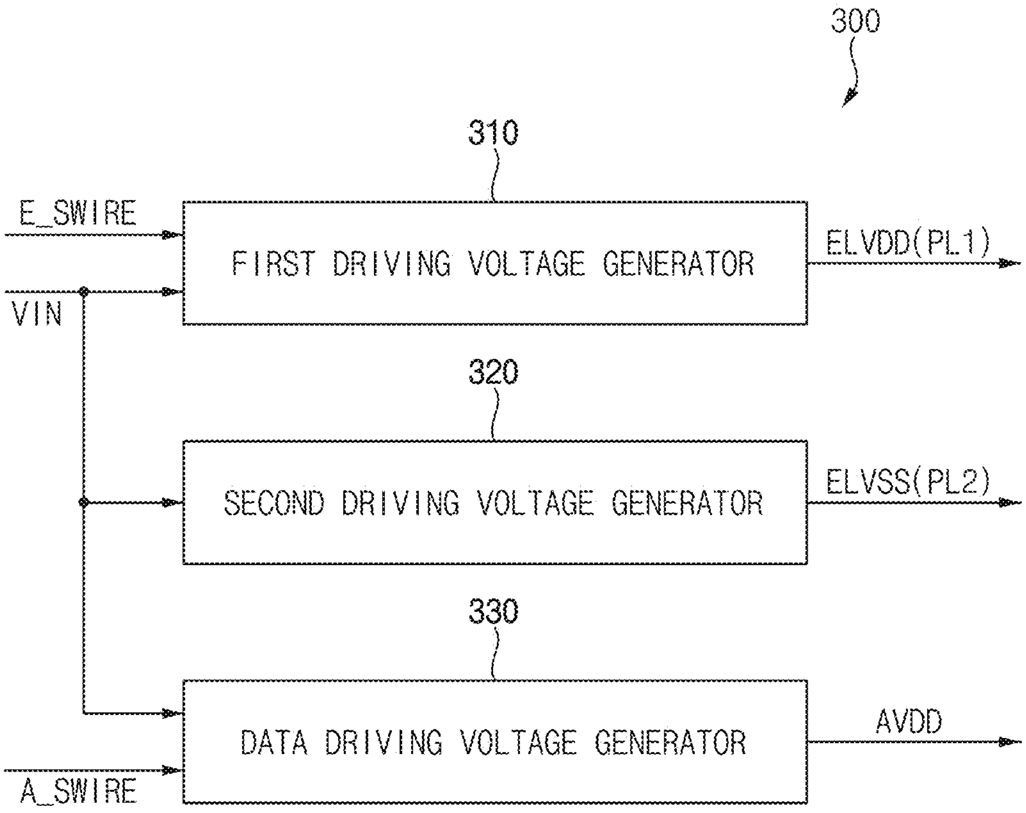
FIG. 3 is a block diagram illustrating a power manager according to an embodiment.
Figure 4:
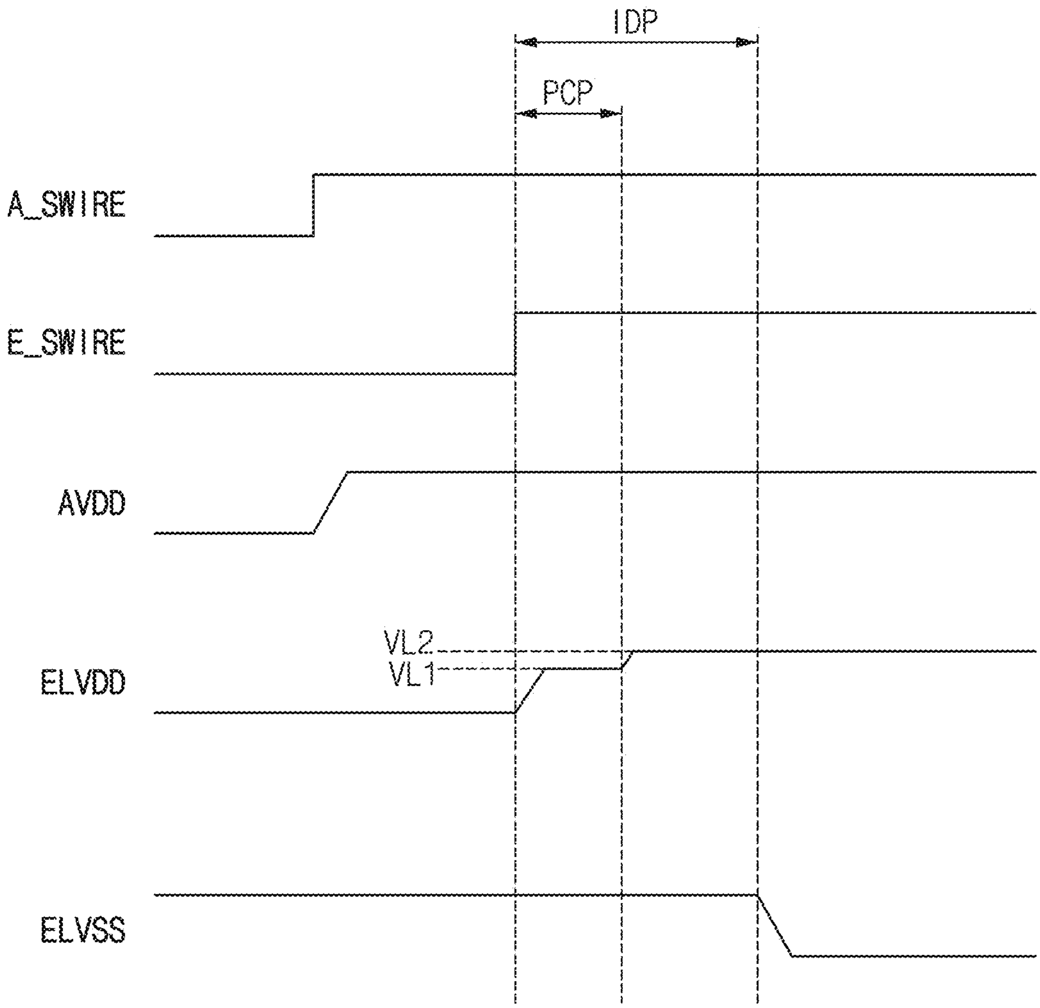
FIG. 4 is a timing diagram for describing an operation of the power manager in FIG. 3.

FIG. 3 is a block diagram illustrating a power manager 300 according to an embodiment. The power manager 300 in FIG. 3 may correspond to the power manager 140 included in the display device 100 in FIG. 1. FIG. 4 is a timing diagram for describing an operation of the power manager 300 in FIG. 3.

Referring to FIGS. 3 and 4, an embodiment of the power manager 300 may include a first driving voltage generator 310, a second driving voltage generator 320, and a data driving voltage generator 330. Each of the first driving voltage generator 310, the second driving voltage generator 320, and the data driving voltage generator 330 may include a direct current-to-direct current ("DC-DC") converter.

The first driving voltage generator 310 may supply the first driving voltage ELVDD to the first power line PL1 based on the input voltage VIN and the second power control signal E_SWIRE. When the second power control signal E_SWIRE is activated, the first driving voltage generator 310 may supply the first driving voltage ELVDD to the first power line PL1. In an embodiment, the second power control signal E_SWIRE may be activated after a preset period after the first power control signal A_SWIRE is activated.

In an embodiment, the first driving voltage generator 310 may supply the first driving voltage ELVDD having a first voltage level VL1 to the first power line PL1 during a pre-charge period PCP, and may supply the first driving voltage ELVDD having a second voltage level VL2 higher than the first voltage level VL1 to the first power line PL1 after the pre-charging period PCP. As the first driving voltage ELVDD increases in two steps from the first voltage level VL1 to the second voltage level VL2, inrush current that can occur in the power manager 300 may be effectively prevented.

In an embodiment, the first voltage level VL1 may be substantially equal to a voltage level of the input voltage VIN. In an embodiment, for example, the input voltage VIN may be about 4.0 V, the first voltage level VL1 of the first driving voltage ELVDD may be about 4.0 V, and the second voltage level VL2 of the first driving voltage ELVDD may be about 4.5 V.

The second driving voltage generator 320 may supply the second driving voltage ELVSS to the second power line PL2 based on the input voltage VIN. The second driving voltage generator 320 may supply the second driving voltage ELVSS to the second power line PL2 after a preset initial driving period IDP after the first driving voltage ELVDD is supplied to the first power line PL1. During the initial driving period IDP, the first driving voltage ELVDD may be supplied to the first power line PL1, and the second driving voltage ELVSS may not be supplied to the second power line PL2.

The data driving voltage generator 330 may supply the data driving voltage AVDD to the data driver 130 in FIG. 1 based on the input voltage VIN and the first power control signal A_SWIRE. When the first power control signal A_SWIRE is activated, the data driving voltage generator 330 may supply the data driving voltage AVDD to the data driver 130.

The data driving voltage generator 330 may generate the data driving voltage AVDD by converting the input voltage VIN. In an embodiment, the data driving voltage generator 330 may generate the data driving voltage AVDD by increasing a voltage level of the input voltage VIN. In an embodiment, for example, the data driving voltage generator 330 may be implemented as a boost converter.

Figure 5:
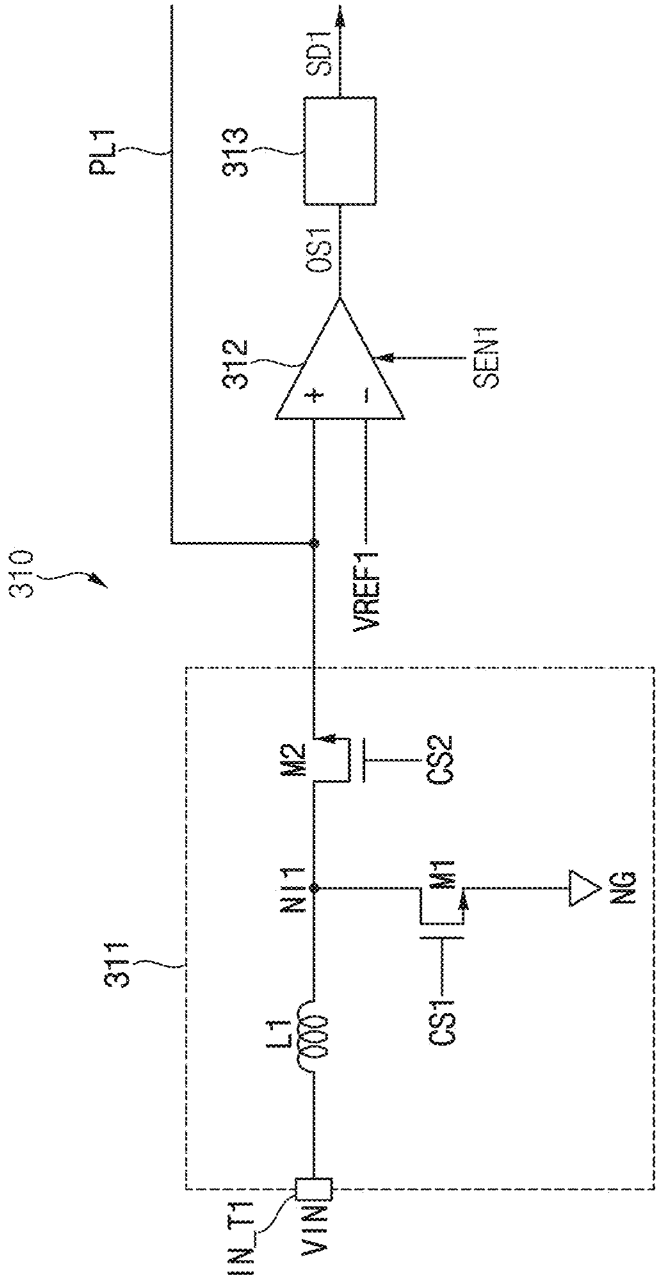
FIG. 5 is a diagram illustrating a first driving voltage generator of the power manager in FIG. 3.
Figure 6:
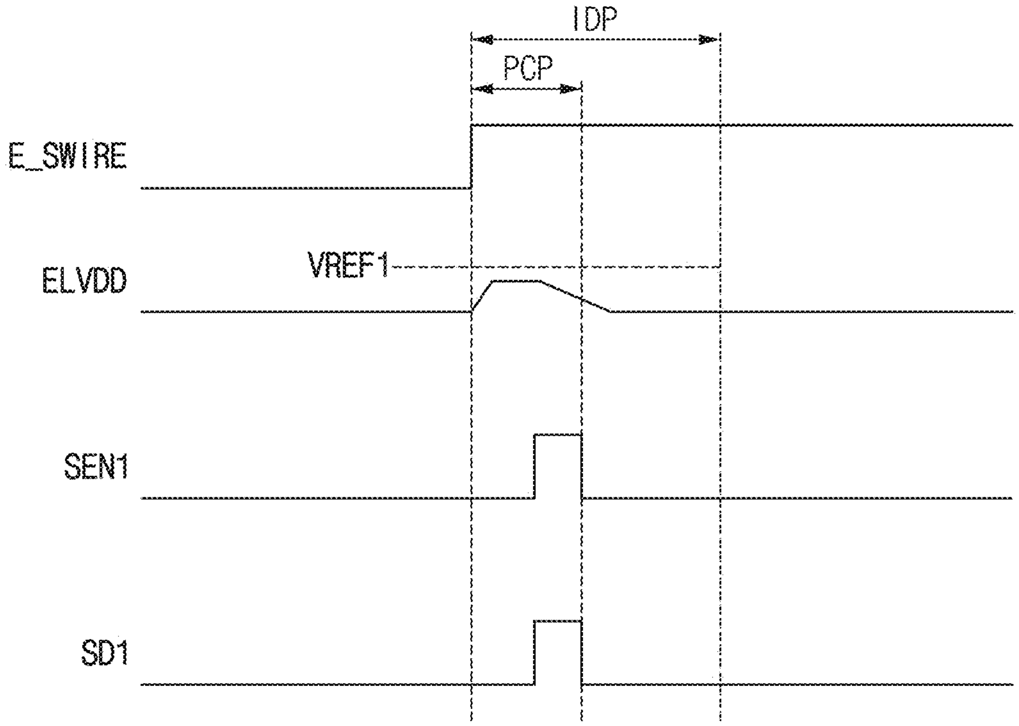
FIG. 6 is a timing diagram for describing an operation of the first driving voltage generator in FIG. 5.

FIG. 5 is a diagram illustrating the first driving voltage generator 310 of the power manager 300 in FIG. 3. FIG. 6 is a timing diagram for describing an operation of the first driving voltage generator 310 in FIG. 5.

Referring to FIGS. 4, 5, and 6, an embodiment of the first driving voltage generator 310 may sense a voltage of the first power line PL1 during a pre-charge period PCP in which the first driving voltage ELVDD having the first voltage level VL1 is supplied to the first power line PL1 and before the first driving voltage ELVDD having the second voltage level VL2 is supplied to the first power line PL1. The first driving voltage generator 310 may control a supply of the first driving voltage ELVDD based on the voltage of the first power line PL1. The first driving voltage generator 310 may include a first driving voltage converter 311, a first comparator 312, and a first determiner 313.

The first driving voltage converter 311 may generate the first driving voltage ELVDD by converting the input voltage VIN. In an embodiment, the first driving voltage converter 311 may generate the first driving voltage ELVDD having the first voltage level VL1 equal to the voltage level of the input voltage VIN during the pre-charge period PCP, and may generate the first driving voltage ELVDD having the second voltage level VL2 by increasing the voltage level of the input voltage VIN after the pre-charge period PCP. In an embodiment, for example, the first driving voltage converter 311 may be implemented as a boost converter. In an embodiment, the first driving voltage converter 311 may include a first inductor L1, a first transistor M1, and a second transistor M2.

The first inductor L1 may be connected between a first input terminal IN_T1 to which the input voltage VIN is supplied and a first intermediate node NI1. The first driving voltage ELVDD may be controlled based on a current flowing through the first inductor L1.

The first transistor M1 may be connected between the first intermediate node NI1 and a ground node NG, and may operate in response to a first control signal CS1. The first transistor M1 may include a first electrode (e.g., a source electrode) connected to the first intermediate node NI1, a second electrode (e.g., a drain electrode) connected to the ground node NG, and a gate electrode that receives the first control signal CS1. The first transistor M1 may control current to flow through the first inductor L1.

The second transistor M2 may be connected between the first intermediate node NI1 and the first power line PL1, and may operate in response to the second control signal CS2. The second transistor M2 may include a first electrode (e.g., a source electrode) connected to the first intermediate node NI1, a second electrode (e.g., a drain electrode) connected to the first power line PL1, and a gate electrode that receives the second control signal CS2. The second transistor M2 may be turned on alternately with the first transistor M1. As the second transistor M2 is turned on after the first transistor M1 is turned on and electromotive force is generated in the first inductor L1, a voltage of the first intermediate node NI1 may be converted to the first driving voltage ELVDD.

FIG. 5 illustrates an embodiment in which each of the first transistor M1 and the second transistor M2 is a P-type transistor (e.g., a PMOS transistor), but the disclosure is not limited thereto. In an alternative embodiment, at least one selected from the first transistor M1 and the second transistor M2 may be an N-type transistor (e.g., an NMOS transistor).

The first comparator 312 may compare the voltage of the first power line PL1 and a first reference voltage VREF1. A first input terminal (e.g., a positive input terminal) of the first comparator 312 may be connected to the first power line PL1, and a second input terminal (e.g., a negative input terminal) of the first comparator 312 may receive the first reference voltage VREF1. In an embodiment, the first reference voltage VREF1 may be less than or equal to the input voltage VIN. In an embodiment, for example, the first reference voltage VREF1 may be about 80% of the input voltage VIN. The first comparator 312 may be activated by a first sensing signal SEN1, and may output an output signal OS1 corresponding to a difference between the voltage of the first power line PL1 and the first reference voltage VREF1 during the activation.

In an embodiment, the first sensing signal SEN1 may be activated during at least a part of the pre-charge period PCP, and may be deactivated after the pre-charge period PCP. Accordingly, the first comparator 312 may be activated during at least a part of the pre-charge period PCP, and may be deactivated after the pre-charge period PCP.

The first determiner 313 may determine whether the first power line PL1 is short-circuited with another line based on the output signal OS1 of the first comparator 312. The first determiner 313 may output a first shutdown signal SD1 to the first driving voltage converter 311 in response to the output signal OS1 of the first comparator 312.

The first determiner 313 may determine that the first power line PL1 is short-circuited with another line when the voltage of the first power line PL1 is less than the first reference voltage VREF1, and may output the first shutdown signal SD1. When the first power line PL1 is short-circuited with another line, a voltage level of the voltage of the first power line PL1 may be lower than the voltage level of the input voltage VIN.

The first determiner 313 may determine that the first power line PL1 is not short-circuited with another line when the voltage of the first power line PL1 is greater than or equal to the first reference voltage VREF1, and may not output the first shutdown signal SD1. When the first power line PL1 is not short-circuited with another line, the first voltage level VL1 of the voltage of the first power line PL1 may be substantially equal to the voltage level of the input voltage VIN.

The first driving voltage converter 311 may stop a generation of the first driving voltage ELVDD in response to the first shutdown signal SD1. In an embodiment, each of the first control signal CS1 and the second control signal CS2 may have a gate turn-off voltage in response to the first shutdown signal SD1, and accordingly, the generation of the first driving voltage ELVDD may be stopped.

In a conventional power manager, a short-circuit between the first power line PL1 and another line may be detected by sensing the voltage of the first power line PL1 after the first driving voltage ELVDD and the second driving voltage ELVSS are supplied to the first power line PL1 and the second power line PL2, respectively. In this case, since the first driving voltage ELVDD is supplied to the first power line PL1 while the first power line PL1 and another line is short-circuited, the power manager 300 and/or the display panel 110 may be damaged (e.g., burnt). In an embodiment of the disclosure, during the pre-charge period PCP before the first driving voltage ELVDD having the second voltage level VL2 is supplied to the first power line PL1, the voltage of the first power line PL1 may be sensed and the supply of the first driving voltage ELVDD may be controlled based on the voltage of the first power line PL1, so that damage of the power manager 300 and/or the display panel 110 due to the short-circuit between the first power line PL1 and another line may be effectively prevented.

Figure 7:
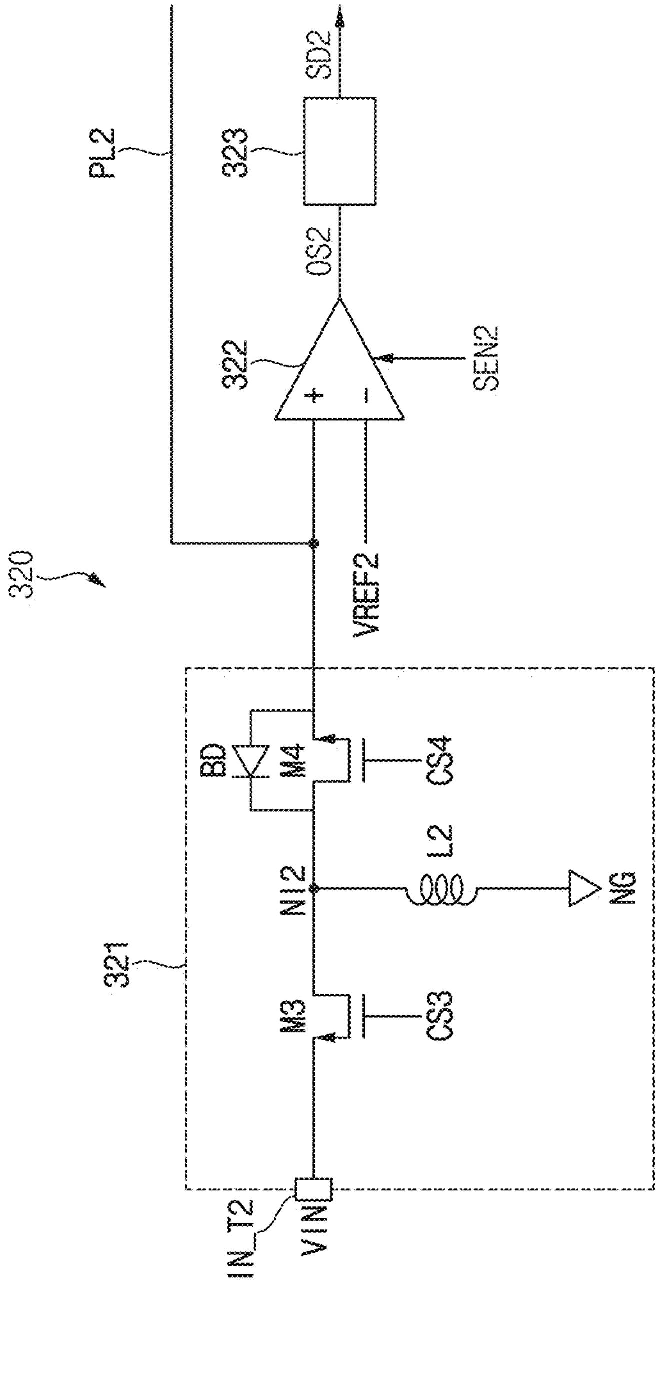
FIG. 7 is a diagram illustrating a second driving voltage generator of the power manager in FIG. 3.
Figure 8:
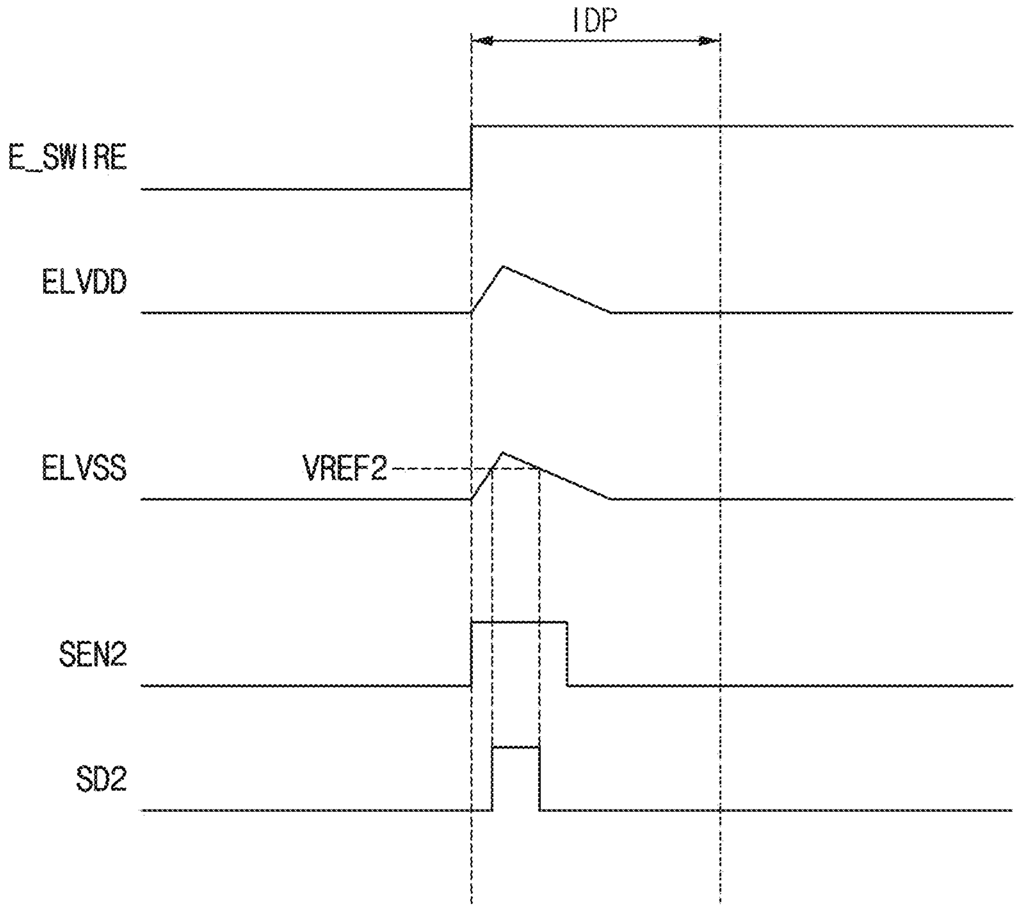
FIG. 8 is a timing diagram for describing an operation of the second driving voltage generator in FIG. 7.

FIG. 7 is a diagram illustrating the second driving voltage generator 320 of the power manager 300 in FIG. 3. FIG. 8 is a timing diagram for describing an operation of the second driving voltage generator 320 in FIG. 7.

Referring to FIGS. 4, 7, and 8, an embodiment of the second driving voltage generator 320 may sense a voltage of the second power line PL2 during the initial driving period IDP in which the first driving voltage ELVDD is supplied to the first power line PL1 and before the second driving voltage ELVSS is supplied to the second power line PL2. A supply of the first driving voltage ELVDD may be controlled based on the voltage of the second power line PL2. The second driving voltage generator 320 may include a second driving voltage converter 321, a second comparator 322, and a second determiner 323.

The second driving voltage converter 321 may generate the second driving voltage ELVSS by converting the input voltage VIN. In an embodiment, the second driving voltage converter 321 may generate the second driving voltage ELVSS by reducing the voltage level of the input voltage VIN after the initial driving period IDP. In an embodiment, for example, the second driving voltage converter 321 may be implemented as an inverting buck-boost converter. In an embodiment, the second driving voltage converter 321 may include a third transistor M3, a second inductor L2, and a fourth transistor M4.

The third transistor M3 may be connected between a second input terminal IN_T2 to which the input voltage VIN is supplied and a second intermediate node NI2, and may operate in response to a third control signal CS3. The third transistor M3 may include a first electrode (e.g., a source electrode) connected to the second input terminal IN_T2, a second electrode (e.g., a drain electrode) connected to the second intermediate node NI2, and a gate electrode that receives the third control signal CS3. The third transistor M3 may control current to flow through the second inductor L2.

The second inductor L2 may be connected between the second intermediate node NI2 and the ground node NG. The second driving voltage ELVSS may be controlled based on a current flowing through the second inductor L2.

The fourth transistor M4 may be connected between the second intermediate node NI2 and the second power line PL2, and may operate in response to a fourth control signal CS4. The fourth transistor M4 may include a first electrode (e.g., a source electrode) connected to the second intermediate node NI2, a second electrode (e.g., a drain electrode) connected to the second power line PL2, and a gate electrode that receives a fourth control signal CS4. The fourth transistor M4 may be turned on alternately with the third transistor M3. As the fourth transistor M4 is turned on after the third transistor M3 is turned on and electromotive force is generated in the second inductor L2, the input voltage VIN may be converted into the second driving voltage ELVSS.

FIG. 7 illustrates an embodiment in which each of the third transistor M3 and the fourth transistor M4 is a P-type transistor (e.g., a PMOS transistor), but the disclosure is not limited thereto. In an alternative embodiment, at least one selected from the third transistor M3 and the fourth transistor M4 may be an N-type transistor (e.g., an NMOS transistor).

The second comparator 322 may compare the voltage of the second power line PL2 and a second reference voltage VREF2. A first input terminal (e.g., a positive input terminal) of the second comparator 322 may be connected to the second power line PL2, and a second input terminal (e.g., a negative input terminal) of the second comparator 322 may receive the second reference voltage VREF2. In an embodiment, the second reference voltage VREF2 may be greater than 0 V, and may be less than a forward voltage (e.g., about 0.7 V) of a body diode BD of the fourth transistor M4. In an embodiment, for example, the second reference voltage VREF2 may be about 0.5 V. The second comparator 322 may be activated by a second sensing signal SEN2, and may output an output signal OS2 corresponding to a difference between the voltage of the second power line PL2 and the second reference voltage VREF2 during the activation.

In an embodiment, the second sensing signal SEN2 may be activated during at least a part of the initial driving period IDP, and may be deactivated after the initial driving period IDP. Accordingly, the second comparator 322 may be activated during at least a part of the initial driving period IDP, and may be deactivated after the initial driving period IDP.

The second determiner 323 may determine whether the second power line PL2 is short-circuited with the first power line PL1 based on the output signal OS2 of the second comparator 322. The second determiner 323 may output a second shutdown signal SD2 to the first driving voltage generator 310 in response to the output signal OS2 of the second comparator 322.

The second determiner 323 may determine that the second power line PL2 is short-circuited with the first power line PL1 when the voltage of the second power line PL2 is greater than or equal to the second reference voltage VREF2, and may output the second shutdown signal SD2. When the second power line PL2 is short-circuited with the first power line PL1, the voltage of the first power line PL1 and the voltage of the second power line PL2 may be maintained at a forward voltage (e.g., about 0.7 V) of the body diode BD of the fourth transistor M4. Accordingly, the voltage of the second power line PL2 may be greater than 0 V during the initial driving period IDP before the second driving voltage ELVSS is supplied to the second power line PL2.

The second determiner 323 may determine that the second power line PL2 is not short-circuited with the first power line PL1 when the voltage of the second power line PL2 is less than the second reference voltage VREF2, and may not output the second shutdown signal SD2. When the second power line PL2 is not short-circuited with the first power line PL1, the voltage of the second power line PL2 may be 0 V.

The first driving voltage converter 311 may stop the generation of the first driving voltage ELVDD in response to the second shutdown signal SD2. In an embodiment, each of the first control signal CS1 and the second control signal CS2 may have a gate turn-off voltage in response to the second shutdown signal SD2, and accordingly, the generation of the first driving voltage ELVDD may be stopped.

In a conventional power manager, a short-circuit between the second power line PL2 and the first power line PL1 may be detected by sensing the voltage of the second power line PL2 after the first driving voltage ELVDD and the second driving voltage ELVSS are supplied to the first power line PL1 and the second power line PL2, respectively. In this case, since the second driving voltage ELVSS is supplied to the second power line PL2 while the second power line PL2 and the first power line PL1 are short-circuited, the power manager 300 and/or the display panel 110 may be damaged (e.g., burnt). In an embodiment of the disclosure, the voltage of the second power line PL2 may be sensed during the initial driving period IDP before the second driving voltage ELVSS is supplied to the second power line PL2, and the supply of the first driving voltage ELVDD may be controlled based on the voltage of the second power line PL2, so that the damage of the power manager 300 and/or the display panel 110 due to the short-circuit between the second power line PL2 and the first power line PL1 may be effectively prevented.

Figure 9:
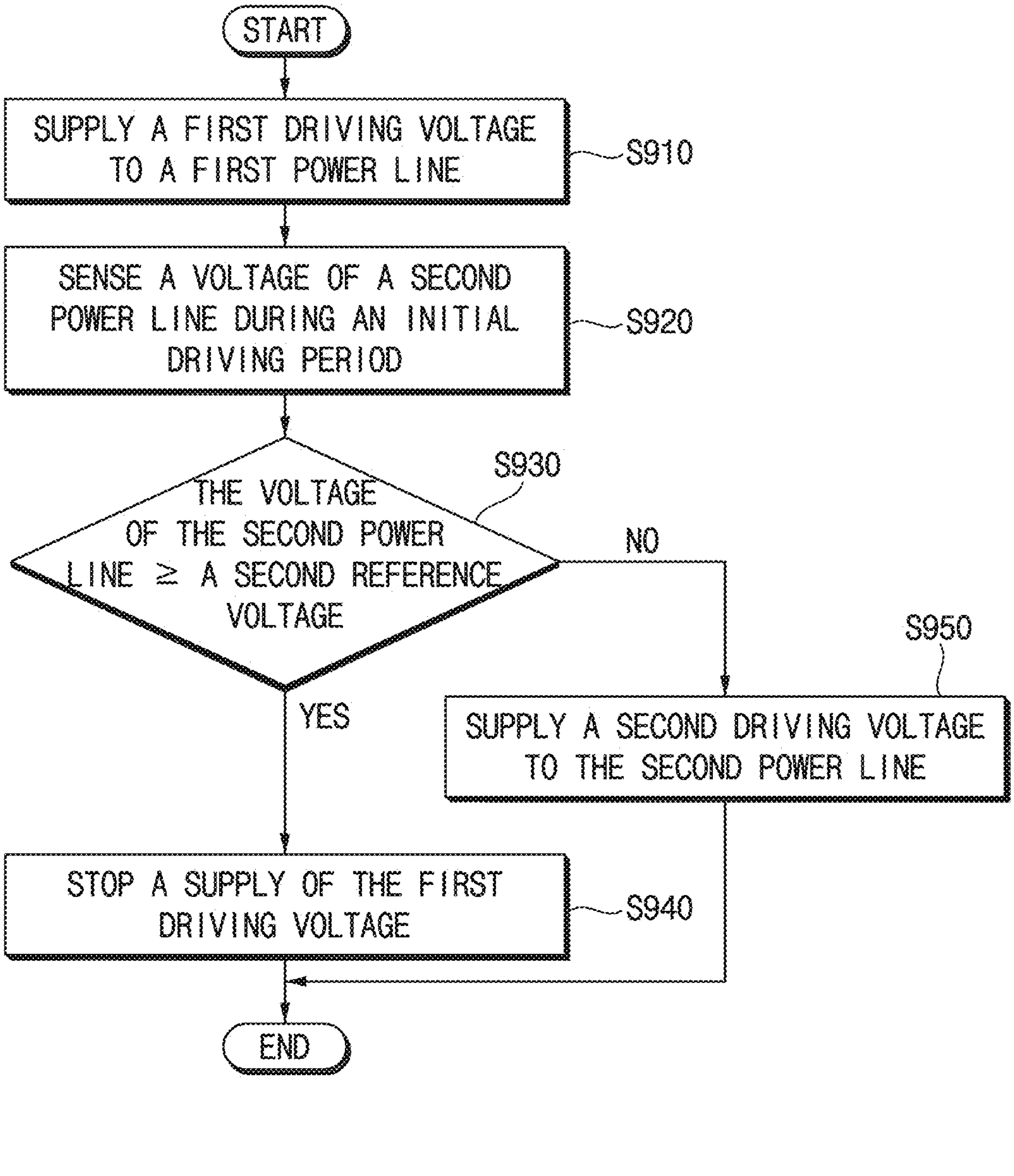
FIG. 9 is a flowchart illustrating a method of driving a power manager according to an embodiment.

FIG. 9 is a flowchart illustrating a method of driving the power manager 300 according to an embodiment.

Referring to FIGS. 3, 4, 8, and 9, in the method of driving the power manager 300 according to an embodiment, the first driving voltage generator 310 may supply the first driving voltage ELVDD to the first power line PL1 in response to the second power control signal E_SWIRE (S910).

The second driving voltage generator 320 may sense the voltage of the second power line PL2 during the initial driving period IDP in which the first driving voltage ELVDD is supplied to the first power line PL1 and before the second driving voltage ELVSS is supplied to the second power line PL2 (S920).

The second driving voltage generator 320 may compare the voltage of the second power line PL2 and the second reference voltage VREF2 while the second sensing signal SEN2 is activated (S930).

The first driving voltage generator 310 may stop the supply of the first driving voltage ELVDD when the voltage of the second power line PL2 is greater than or equal to the second reference voltage VREF2 (S940). Accordingly, damage of the power manager 300 and/or the display panel 110 due to a short-circuit between the second power line PL2 and the first power line PL1 may be effectively prevented.

The second driving voltage generator 320 may supply the second driving voltage ELVSS to the second power line PL2 when the voltage of the second power line PL2 is less than the second reference voltage VREF2 (S950). Accordingly, the first driving voltage ELVDD and the second driving voltage ELVSS may be provided to the first power line PL1 and the second power line PL2, respectively, and the display panel 110 may display an image.

Figure 10:
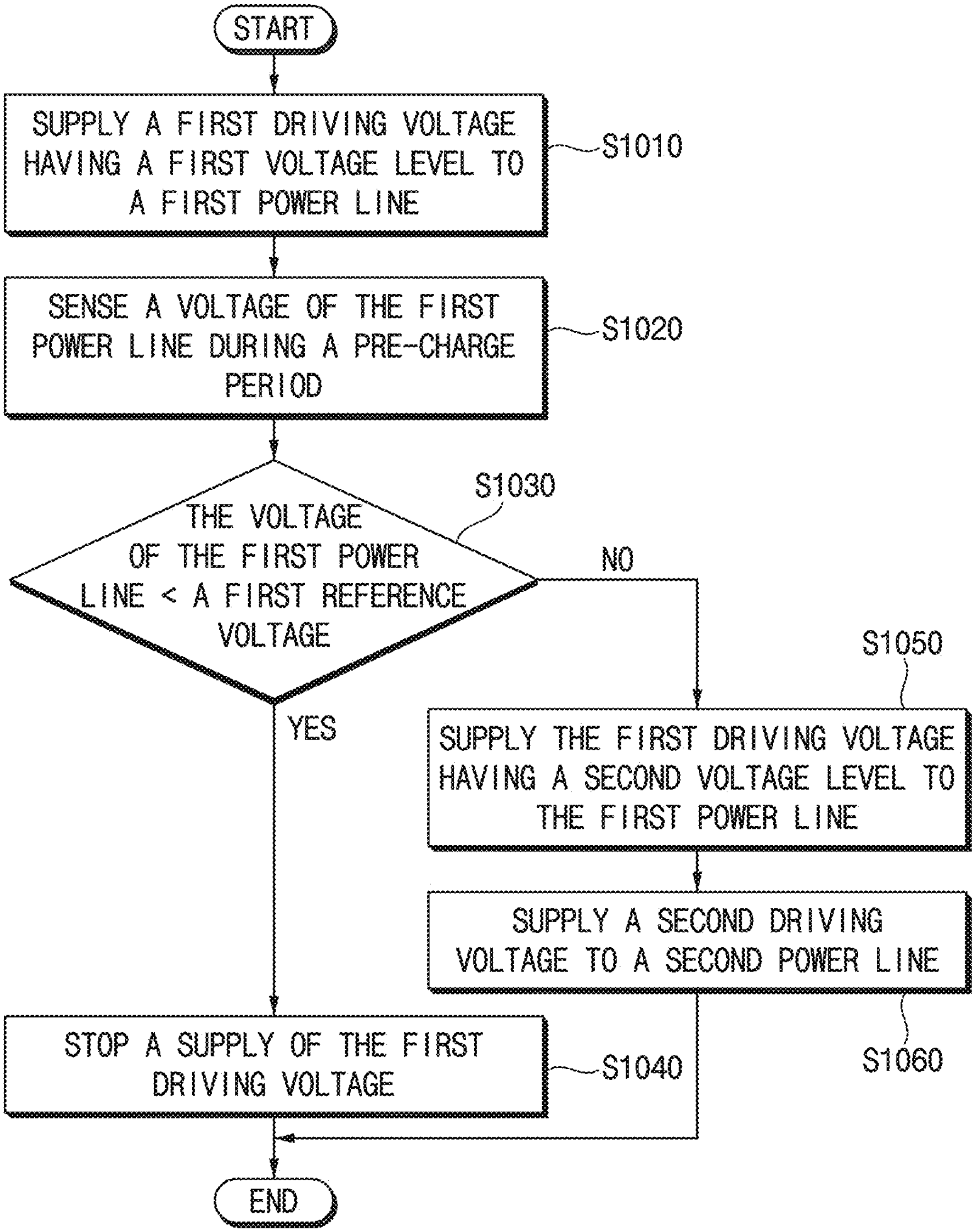
FIG. 10 is a flowchart illustrating a method of driving a power manager according to an embodiment.

FIG. 10 is a flowchart illustrating a method of driving the power manager 300 according to an embodiment.

Referring to FIGS. 3, 4, 6, and 10, in the driving method of the power manager 300 according to an embodiment, the first driving voltage generator 310 may supply the first driving voltage ELVDD having the first voltage level VL1 to the first power line PL1 in response to the second power control signal E_SWIRE (S1010).

The first driving voltage generator 310 may sense the voltage of the first power line PL1 during the pre-charge period PCP in which the first driving voltage ELVDD having the first voltage level VL1 is supplied to the first power line PL1 and before the first driving voltage ELVDD having the second voltage level VL2 is supplied to the first power line PL1 (S1020).

The first driving voltage generator 310 may compare the voltage of the first power line PL1 and the first reference voltage VREF1 while the first sensing signal SEN1 is activated (S1030).

The first driving voltage generator 310 may stop the supply of the first driving voltage ELVDD when the voltage of the first power line PL1 is less than the first reference voltage VREF1 (S1040). Accordingly, damage of the power manager 300 and/or the display panel 110 due to a short-circuit between the first power line PL1 and another line may be effectively prevented.

The first driving voltage generator 310 may supply the first driving voltage ELVDD having the second voltage level VL2 to the first power line PL1 after the pre-charge period PCP when the voltage of the first power line PL1 is greater than or equal to the first reference voltage VREF1 (S1050).

The second driving voltage generator 320 may supply the second driving voltage ELVSS to the second power line PL2 after the initial driving period IDP (S1060). Accordingly, the first driving voltage ELVDD and the second driving voltage ELVSS may be provided to the first power line PL1 and the second power line PL2, respectively, and the display panel 110 may display an image.

Figure 11:
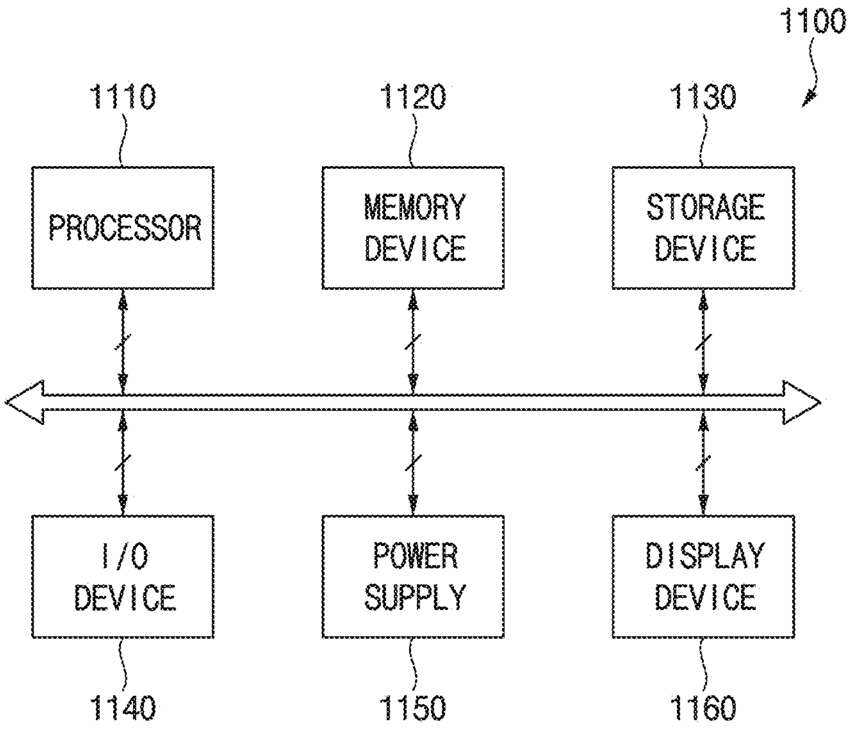
FIG. 11 is a block diagram illustrating an electronic apparatus including a display device according to an embodiment.

FIG. 11 is a block diagram illustrating an electronic apparatus including a display device according to an embodiment.

Referring to FIG. 11, an embodiment of the electronic apparatus 1100 may include a processor 1110, a memory device 1120, a storage device 1130, an input/output ("I/O") device 1140, a power supply 1150, and the display device 1160. The display device 1160 may correspond to the display device 100 in FIG. 1. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be a microprocessor, a central processing unit ("CPU"), or the like. The processor 1110 may be coupled to other components via an address bus, a control bus, a data bus, or the like. In an embodiment, the processor 1110 may be coupled to an extended bus such as a peripheral component interconnection ("PCI") bus.

The memory device 1120 may store data for operations of the electronic apparatus 1100. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a CD-ROM device, or the like. The I/O device 1140 may include an input device such as a keyboard, a keypad, a touchpad, a touch-screen, a mouse device, etc., and an output device such as a speaker, a printer, etc. The power supply 1150 may supply a power used for the operation of the electronic apparatus 1100. The display device 1160 may be coupled to other components via the buses or other communication links.

In the display device 1160, during an initial driving period in which a first driving voltage is supplied to a first power line and before a second driving voltage is supplied to a second power line, a voltage of the second power line may be sensed, and a supply of the first driving voltage may be controlled based on the voltage of the second power line, so that damage of a power manager and/or a display panel included in the display device 1160 may be effectively prevented.

The display device according to the embodiments may be applied to a display device included in a computer, a notebook, a mobile phone, a smart phone, a smart pad, a portable media player ("PMP"), a personal digital assistant ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A power manager, comprising:

a first driving voltage generator which supplies a first driving voltage to a first power line, wherein the first driving voltage generator includes:

a first driving voltage converter which generates the first driving voltage by converting an input voltage supplied from an exterior;

a first comparator which compares the voltage of the first power line and a first reference voltage; and a first determiner which outputs a first shutdown signal to the first driving voltage converter in response to an output signal of the first comparator; and a second driving voltage generator which supplies a second driving voltage to a second power line, wherein a voltage level of the second driving voltage is lower than a voltage level of the first driving voltage, wherein, during an initial driving period in which the first driving voltage is supplied to the first power line and before the second driving voltage is supplied to the second power line, the second driving voltage generator senses a voltage of the second power line, and a supply of the first driving voltage is controlled based on the voltage of the second power line, wherein the initial driving period includes a pre-charge period and during the pre-charge period the first driving voltage has a first voltage level that is equal to an input voltage of the first driving voltage generator and after the pre-charge period the first driving voltage generator increases the first driving voltage to a second voltage level that is greater than the first voltage level, wherein the first determiner outputs the first shutdown signal when the voltage of the first power line is less than the first reference voltage, wherein the first comparator is active solely during the pre-charge period, and wherein the first comparator is activated by a first sensing signal during at least a part of the pre-charge period and is deactivated at an end of the pre-charge period.

2. The power manager of claim 1, wherein the second driving voltage generator includes:

a second driving voltage converter which generates the second driving voltage by converting an input voltage supplied from the exterior;

a second comparator which compares the voltage of the second power line and a second reference voltage; and a second determiner which outputs a second shutdown signal to the first driving voltage generator in response to an output signal of the second comparator.

3. The power manager of claim 2, wherein the second driving voltage converter includes:

a third transistor connected between a second input terminal which receives the input voltage and a second intermediate node, wherein the third transistor operates in response to a third control signal;

a second inductor connected between the second intermediate node and a ground node; and a fourth transistor connected between the second intermediate node and the second power line, wherein the fourth transistor operates in response to a fourth control signal.

4. The power manager of claim 2, wherein the second comparator is activated during at least a part of the initial driving period and deactivated after the initial driving period.

5. The power manager of claim 2, wherein the second determiner outputs the second shutdown signal when the voltage of the second power line is greater than or equal to the second reference voltage.

6. The power manager of claim 2, wherein the first driving voltage generator stops the supply of the first driving voltage in response to the second shutdown signal.

7. The power manager of claim 1, wherein, during the pre-charge period the first driving voltage generator senses a voltage of the first power line, and controls the supply of the first driving voltage based on the voltage of the first power line.

8. The power manager of claim 7, wherein the first driving voltage converter includes:

a first inductor connected between a first input terminal which receives the input voltage and a first intermediate node;

a first transistor connected between the first intermediate node and a ground node, wherein the first transistor operates in response to a first control signal; and a second transistor connected between the first intermediate node and the first power line, wherein the second transistor operates in response to a second control signal.

9. The power manager of claim 7, wherein the first driving voltage converter stops a generation of the first driving voltage in response to the first shutdown signal.

10. A method of driving a power manager, the method comprising:

supplying a first driving voltage to a first power line;

sensing a voltage of a second power line during an initial driving period in which the first driving voltage is supplied to the first power line and before a second driving voltage is supplied to a second power line, wherein a voltage level of the second driving voltage is lower than a voltage level of the first driving voltage;

controlling a supply of the first driving voltage based on the voltage of the second power line;

sensing a voltage of the first power line during a pre-charge period in which the first driving voltage having a first voltage level is supplied to the first power line and before the first driving voltage having a second voltage level higher than the first voltage level is supplied to the first power line;

controlling the supply of the first driving voltage based on the voltage of the first power line; and outputting a first shutdown signal when the voltage of the first power line is less than a first reference voltage, wherein the initial driving period includes a pre-charge period and during the pre-charge period the first driving voltage has a first voltage level that is equal to an input voltage of the first driving voltage generator and after the pre-charge period the first driving voltage generator increases the first driving voltage to a second voltage level that is greater than the first voltage level, wherein comparing the voltage of the first power line and the first reference voltage is performed by a first comparator that is active solely during the pre-charge period, and wherein the first comparator is activated by a first sensing signal during at least a part of the pre-charge period and is deactivated at an end of the pre-charge period.

11. The method of claim 10, wherein controlling the supply of the first driving voltage based on the voltage of the second power line includes:

comparing the voltage of the second power line and a second reference voltage; and stopping the supply of the first driving voltage when the voltage of the second power line is greater than or equal to the second reference voltage.

12. The method of claim 11, further comprising:

supplying the second driving voltage to the second power line when the voltage of the second power line is less than the second reference voltage.

13. The method of claim 10, wherein controlling the supply of the first driving voltage based on the voltage of the first power line includes:

comparing the voltage of the first power line and the first reference voltage; and stopping the supply of the first driving voltage when the voltage of the first power line is less than the first reference voltage.

14. A display device, comprising:

a display panel which includes a pixel;

a scan driver which supplies a scan signal to the pixel;

a data driver which supplies a data signal to the pixel; and a power manager which supplies a first driving voltage and a second driving voltage to the pixel, wherein a voltage level of the second driving voltage is lower than a voltage level of the first driving voltage, wherein the power manager includes:

a first driving voltage generator which supplies the first driving voltage to the pixel through a first power line; and a second driving voltage generator which supplies the second driving voltage to the pixel through a second power line, wherein, during an initial driving period in which the first driving voltage is supplied to the first power line and before the second driving voltage is supplied to the second power line, the second driving voltage generator senses a voltage of the second power line, and a supply of the first driving voltage is controlled based on the voltage of the second power line, wherein the initial driving period includes a pre-charge period and the during pre-charge period the first driving voltage has a first voltage level that is equal to an input voltage of the first driving voltage generator and after the pre-charge period the first driving voltage generator increases the first driving voltage to a second voltage level that is greater than the first voltage level, wherein a first determiner of the first driving voltage generator outputs a first shutdown signal when the voltage of the first power line is less than a first reference voltage, wherein the first driving voltage generator includes a first comparator that is active solely during the pre-charge period, and wherein the first comparator is activated by a first sensing signal during at least a part of the pre-charge period and is deactivated at an end of the pre-charge period.

15. The display device of claim 14, wherein, during the pre-charge period the first driving voltage generator senses a voltage of the first power line, and controls the supply of the first driving voltage based on the voltage of the first power line.

16. The display device of claim 14, wherein the pixel includes:

a driving transistor connected between the first power line and a first node, wherein the driving transistor operates in response to a voltage of a second node;

a switching transistor connected between a data line 103 which transmits the data signal and the second node, wherein the switching transistor operates in response to the scan signal;

a storage capacitor connected between the first power line and the second node; and a light emitting diode connected between the first node and the second power line.

* * * * *